US008589285B2

(12) United States Patent
Monk

(10) Patent No.: US 8,589,285 B2
(45) Date of Patent: *Nov. 19, 2013

(54) SYSTEM, APPARATUS AND METHODS FOR COMPARING FRAUD PARAMETERS FOR APPLICATION DURING PREPAID CARD ENROLLMENT AND TRANSACTIONS

(75) Inventor: Justin T. Monk, Parker, CO (US)

(73) Assignee: Visa U.S.A. Inc., San Francisco, CA (US)

( * ) Notice: Subject to any disclaimer, the term of this patent is extended or adjusted under 35 U.S.C. 154(b) by 1022 days.

This patent is subject to a terminal disclaimer.

(21) Appl. No.: 12/565,601

(22) Filed: Sep. 23, 2009

(65) Prior Publication Data

US 2010/0070424 A1   Mar. 18, 2010

Related U.S. Application Data

(63) Continuation of application No. 11/757,985, filed on Jun. 4, 2007, now Pat. No. 7,627,522.

(51) Int. Cl.
*G06Q 40/00* (2012.01)

(52) U.S. Cl.
USPC .............................. 705/38; 705/30

(58) Field of Classification Search
USPC ..................................... 705/10–44
See application file for complete search history.

(56) References Cited

U.S. PATENT DOCUMENTS

| 4,485,300 A | 11/1984 | Peirce |
| 5,465,206 A | 11/1995 | Hilt et al. |
| 5,477,038 A | 12/1995 | Levine et al. |
| 5,500,513 A | 3/1996 | Langhans et al. |
| 5,621,201 A | 4/1997 | Langhans et al. |
| 5,815,665 A | 9/1998 | Teper et al. |
| 5,819,226 A * | 10/1998 | Gopinathan et al. ............ 705/44 |
| 5,845,070 A | 12/1998 | Ikudome |
| 6,247,129 B1 | 6/2001 | Keathley et al. |
| 6,270,011 B1 | 8/2001 | Gottfried |
| 6,282,522 B1 | 8/2001 | Davis et al. |
| 6,330,546 B1 | 12/2001 | Gopinathan et al. |
| 6,560,581 B1 | 5/2003 | Fox et al. |
| 6,570,968 B1 | 5/2003 | Marchand et al. |

(Continued)

FOREIGN PATENT DOCUMENTS

EP   0669032 B1   11/1997

OTHER PUBLICATIONS

U.S. Appl. No. 11/757,623.
U.S. Appl. No. 11/757,837.

(Continued)

*Primary Examiner* — Frantzy Poinvil
(74) *Attorney, Agent, or Firm* — Kilpatrick Townsend & Stockton LLP

(57) ABSTRACT

An apparatus is disclosed. The apparatus is for comparing a set of production fraud parameters with one or more sets of test or proposed fraud parameters run against prepaid card production data in a prepaid card analysis. The apparatus may include a system for uploading a set of production fraud parameters and one or more sets of test fraud parameters, a processing engine for receiving the uploaded parameters for running production data against the set of production fraud parameters in tandem with the one or more sets of test fraud parameters to produce a set of suspected fraud cases triggered by each set of fraud parameters, and one or more databases integrated with or in communications with the processing engine for card validation.

27 Claims, 15 Drawing Sheets

(56) References Cited

U.S. PATENT DOCUMENTS

| | | |
|---|---|---|
| 6,837,425 B2 | 1/2005 | Gauthier et al. |
| 6,915,279 B2 | 7/2005 | Hogan et al. |
| 6,920,611 B1 | 7/2005 | Spaeth et al. |
| 6,957,334 B1 | 10/2005 | Goldstein et al. |
| 7,007,840 B2 | 3/2006 | Davis |
| 7,039,611 B2 | 5/2006 | Devine |
| 7,051,923 B2 | 5/2006 | Nguyen et al. |
| 7,104,446 B2 | 9/2006 | Bortolin et al. |
| 7,111,789 B2 | 9/2006 | Rajasekaran et al. |
| 7,121,456 B2 | 10/2006 | Speath et al. |
| 7,124,937 B2 | 10/2006 | Myers et al. |
| 7,136,841 B2 | 11/2006 | Cook |
| 7,152,780 B2 | 12/2006 | Gauthier et al. |
| 7,231,657 B2 | 6/2007 | Honarvar et al. |
| 7,243,853 B1 | 7/2007 | Levy et al. |
| 7,251,624 B1 | 7/2007 | Lee et al. |
| 7,263,506 B2 | 8/2007 | Lee et al. |
| 7,280,981 B2 | 10/2007 | Huang et al. |
| 7,353,214 B2 | 4/2008 | Yamanishi et al. |
| 7,527,195 B2 | 5/2009 | Keithley |
| 7,627,522 B2 | 12/2009 | Monk |
| 7,657,497 B2 | 2/2010 | Nandy |
| 8,061,597 B2 * | 11/2011 | Hogg et al. .......... 235/380 |
| 2002/0046341 A1 | 4/2002 | Kazaks et al. |
| 2002/0111919 A1 | 8/2002 | Weller et al. |
| 2002/0194122 A1 | 12/2002 | Knox et al. |
| 2002/0194138 A1 | 12/2002 | Dominguez et al. |
| 2003/0120593 A1 | 6/2003 | Bansal et al. |
| 2003/0172040 A1 | 9/2003 | Kemper et al. |
| 2003/0200184 A1 | 10/2003 | Dominguez et al. |
| 2003/0212642 A1 | 11/2003 | Weller et al. |
| 2003/0220860 A1 | 11/2003 | Heytens et al. |
| 2003/0233292 A1 | 12/2003 | Richey et al. |
| 2004/0019522 A1 | 1/2004 | Bortolin et al. |
| 2004/0044621 A1 | 3/2004 | Huang et al. |
| 2004/0050922 A1 | 3/2004 | Gauthier et al. |
| 2004/0054581 A1 | 3/2004 | Redford et al. |
| 2004/0054590 A1 | 3/2004 | Redford et al. |
| 2004/0054591 A1 | 3/2004 | Spaeth et al. |
| 2004/0059688 A1 | 3/2004 | Dominguez et al. |
| 2004/0139021 A1 | 7/2004 | Reed et al. |
| 2004/0148224 A1 | 7/2004 | Gauthier et al. |
| 2004/0153715 A1 | 8/2004 | Spaeth et al. |
| 2004/0220964 A1 | 11/2004 | Shiftan et al. |
| 2005/0021456 A1 | 1/2005 | Steele et al. |
| 2005/0029344 A1 | 2/2005 | Davis |
| 2005/0036611 A1 | 2/2005 | Seaton, Jr. et al. |
| 2005/0045718 A1 | 3/2005 | Bortolin et al. |
| 2005/0058427 A1 | 3/2005 | Nguyen et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0071235 A1 | 3/2005 | Nguyen et al. |
| 2005/0102234 A1 | 5/2005 | Devine |
| 2005/0121506 A1 | 6/2005 | Gauthier et al. |
| 2005/0149455 A1 | 7/2005 | Bruesewitz et al. |
| 2005/0246278 A1 | 11/2005 | Gerber et al. |
| 2005/0283416 A1 | 12/2005 | Reid et al. |
| 2005/0283430 A1 | 12/2005 | Reid et al. |
| 2005/0283431 A1 | 12/2005 | Reid et al. |
| 2005/0283432 A1 | 12/2005 | Reid et al. |
| 2005/0283433 A1 | 12/2005 | Reid et al. |
| 2006/0006224 A1 | 1/2006 | Modi |
| 2006/0080243 A1 | 4/2006 | Kemper et al. |
| 2006/0155644 A1 | 7/2006 | Reid et al. |
| 2006/0163345 A1 | 7/2006 | Myers et al. |
| 2006/0178957 A1 | 8/2006 | LeClaire |
| 2006/0179007 A1 | 8/2006 | Davis |
| 2006/0255125 A1 | 11/2006 | Jennings et al. |
| 2006/0290501 A1 | 12/2006 | Hammad et al. |
| 2006/0293027 A1 | 12/2006 | Hammad et al. |
| 2007/0001000 A1 | 1/2007 | Nguyen et al. |
| 2007/0001001 A1 | 1/2007 | Myers et al. |
| 2007/0005613 A1 | 1/2007 | Singh et al. |
| 2007/0005774 A1 | 1/2007 | Singh et al. |
| 2007/0012764 A1 | 1/2007 | Bortolin et al. |
| 2007/0017970 A1 | 1/2007 | Gauthier et al. |
| 2007/0034679 A1 | 2/2007 | Gauthier et al. |
| 2007/0055597 A1 | 3/2007 | Patel et al. |
| 2007/0055630 A1 | 3/2007 | Gauthier et al. |
| 2007/0057034 A1 | 3/2007 | Gauthier et al. |
| 2007/0057051 A1 | 3/2007 | Bortolin et al. |
| 2007/0083465 A1 | 4/2007 | Ciurea et al. |
| 2007/0100691 A1 | 5/2007 | Patterson |
| 2007/0125842 A1 | 6/2007 | Antoo et al. |
| 2007/0288641 A1 | 12/2007 | Lee et al. |
| 2008/0046334 A1 | 2/2008 | Lee et al. |
| 2008/0077515 A1 | 3/2008 | Zoldi et al. |
| 2008/0109392 A1 | 5/2008 | Nandy et al. |
| 2008/0275829 A1 | 11/2008 | Stull et al. |

OTHER PUBLICATIONS

U.S. Appl. No. 11/757,980.
U.S. Appl. No. 11/757,983.
U.S. Appl. No. 11/757,914.
U.S. Appl. No. 11/757,893.
Notification Concerning Transmittal of International Preliminary Report on Patentability dated Dec. 17, 2009 from International Application No. PCT/US2008/065551, 6 pages.
International Preliminary Report on Patentability dated Dec. 17, 2009 from International Application No. PCT/US2008/065551, 6 pages.

* cited by examiner

FIG. 3

Prepaid Card

:: Home :: Help :: Sign out

Gift Card :: Fact Sheet | Card Program Documents [>]

| Account History || Notes || Profile Update || Close Call || Search || Transaction [>] || Select Function [>] |

PAN: 9999 1100 0000 0022

Title    First Name    MI    Last Name    Suffix

Address Line 1

Address Line 2

City    State [TN >]    ZIP Code    Country Code [USA]

Primary Phone    Type [Home >]    Ext.    Alternate Phone    Type [Home >]    Ext.

Date of Birth (MMDDYYYY)    Government ID Number    Government ID Type [Social Security >]

Select Personalized Question [Mother's maiden name >]    Create Personalized Question Personalized Answer Email Address    Re-Enter Email Address Special Instructions

Prepaid Administration System

Your Financial Institution Payroll Card | Program Documents :: Home :: Help :: Sign out > Search For ... | > Card Sales | > Work Queues | > Manage Program | > Reports | > Risk Management

Parameter Set Details
Home > Limits & Thresholds > Parameter Set Details                <Room for system messages>

- ☑ Overview
- Fraud Parameter Sets
- Details
- Audit Log
- ☑ Tasks
- Add New Parameter Set
- Compare Parameters

Parameter Set
Setname: Test Settings 021505                Status: Test
Date Last Modified: 02-11-2005               Modified By: ppc.kkelley

Standard Limits and Thresholds
You can specify a single set of values for the following Limits and Thresholds. To deactivate a Limit or Threshold, set its values to blank. Note: Threshold values must be less than or equal to the corresponding limit value.

| Trigger | Type | Decline Code | Limit Override by PAS User | Production Value | Production Period | New Settings Value | New Settings Period |
|---|---|---|---|---|---|---|---|
| # Accounts Purchased with same Buyer Address | Limit | 122 | ☐ Yes | 7 cards | in 4 days | 7 cards | in 3 days |
|  | Threshold | N/A |  | 4 cards |  | 3 cards |  |
| # Accounts Purchased with same Cardholder Address | Limit | 122 | ☐ Yes | 3 cards | In 4 days | 3 cards | in 3 days |
|  | Threshold | N/A |  | 2 cards |  | 1 cards |  |
| # Accounts Purchased with same Cardholder Phone | Limit | 122 | ☐ Yes | 7 cards | in 4 days | 7 cards | in 3 days |
|  | Threshold | N/A |  | 4 cards |  | 3 cards |  |
| Maximum # Cards in single purchase | Limit | 122 | ☐ Yes | 14 cards |  | 3 cards |  |
|  | Threshold | N/A |  | 12 cards |  | 2 cards |  |
| Maximum $ Value of a Single Purchase | Limit | 122 | ☐ Yes | $5,000 |  | $5000 |  |
|  | Threshold | N/A |  | $3,000 |  | $3000 |  |
| Funding Account Usage | Limit | 122 | ☐ Yes | 14 cards | in 4 days | 3 cards | in 3 days |
|  | Threshold | N/A |  | 12 cards |  | 2 cards |  |
| Funding Account Total Purchase $ Amount | Limit | 122 | ☐ Yes | $5,000 | in 4 days | $5000 | in 3 days |
|  | Threshold | N/A |  | $3,000 |  | $3000 |  |
| Minimum Dollar Load Per Transaction | Limit | 122 | ☐ Yes | $20 |  | $35 |  |
|  | Threshold | N/A |  | $25 |  | $45 |  |
| Maximum Dollar Load Per Transaction | Limit | 122 | ☐ Yes | $10,000 |  | $5000 |  |
|  | Threshold | N/A |  | $5,000 |  | $4500 |  |
| Maximum Dollar Loads Per Day | Limit | 122 | ☐ Yes | $3,000 |  | $5000 |  |
|  | Threshold | N/A |  | $2,000 |  | $4500 |  |
| Maximum Account Balance | Limit | 122 | ☐ Yes | $3,000 |  | $5000 |  |
|  | Threshold | N/A |  | $2,000 |  | $4500 |  |
| Maximum Yearly $ contribution to a Health Savings Account | Limit | 122 | ☐ Yes | $10,000 |  | $5000 |  |
|  | Threshold | N/A |  | $5,000 |  | $4500 |  |
| Maximum Load Count | Limit | 122 | ☐ Yes | 5 times | in 2 days | 3 times | in 3 days |
|  | Threshold | N/A |  | 4 times |  | 2 times |  |
| Cash Withdrawal Single Transaction | Limit | 122 | ☐ Yes | $500 |  | $500 |  |
|  | Threshold | N/A |  | $400 |  | $450 |  |
| Purchase Limit - Single Transaction | Limit | 122 | ☐ Yes | $500 |  | $500 |  |
|  | Threshold | N/A |  | $400 |  | $450 |  |
| Funding Account Additions or Changes | Limit | N/A | N/A | 5 times | in 6 days | 3 times | in 3 days |
|  | Threshold | N/A |  | 4 times |  | 2 times |  |
| Cardholder primary Address Changes | Limit | N/A | N/A | 5 times | in 6 days | 3 times | in 3 days |
|  | Threshold | N/A |  | 4 times |  | 2 times |  |

FIG. 4

Prepaid Card System

[PRINT] [CLOSE]

| | | | |
|---|---|---|---|
| Issuer: | Your Financial Institution | Card Program: | Your Financial Institution Reloadable |
| Location: | Your Financial Institution | | |
| Base Set Name: | Test Settings 1 | Comparison Set: | January Settings |
| Start Test Date: | 02-01-05 | Ending Test Date: | 02-15-05 |

| | |
|---|---|
| Base Cases Created: | 100 |
| Compare Cases Created: | 110 |
| Difference: | 10 |
| Percentage Variance: | 10% |

Fraud Rules with Multiple Triggers

You can set each trigger relating to this rule as on or off. Detail for all triggers will still appear in the Fraud case for reference purposes.

| Rule | Current Trigger | New Settings | Difference | |
|---|---|---|---|---|
| | Active Trigger | Active | Hits | % |
| ▼ Address Verification | | | | |
| | ☑ A - Address ambiguous | ☑ | -1,000 | N/A |
| | ☑ B - Match to business name - residential address | ☑ | 50 | 3% |
| | ☑ B0 - Business name match - no confirmation | ☑ | -25 | -100% |
| | ☑ B1 - Business name match - single source confirms | ☑ | +100 | N/A |
| | ☑ B2 - Business name match - two sources confirm | ☑ | 50 | 4% |
| | ☑ BB - Match to business name - business address | ☑ | 200 | 1000% |
| | ☑ BM - Match to business name - mixed use address | ☑ | 50 | 3% |
| | ☑ E - Matching records exceed maximum defined in profile | ☑ | 24 | 7% |
| | ☑ E0 - Error - no confirmation | ☑ | -25 | -5% |
| | ☑ E1 - Error - single source confirms | ☑ | 0 | 0% |
| | ☑ E2 - Error - two sources confirm | ☑ | -25 | -100% |
| | ☑ F0 - Full name match - no confirmation | ☑ | +100 | N/A |
| | ☑ F1 - Full name match - single source confirms | ☑ | 50 | 4% |
| | ☑ F2 - Full name match - two sources confirm | ☑ | 200 | 1000% |
| | ☑ H - House number not found on street | ☑ | 50 | 3% |
| | ☑ I - Incomplete or blank address | ☑ | 24 | 7% |
| | ☑ IV - Invalid address | ☑ | -25 | -5% |
| | ☑ N - No match to name - residential address | ☑ | 0 | 0% |
| | ☑ N0 - No name match - no confirmation | ☑ | -25 | -100% |
| | ☑ N1 - No name match - single source confirms | ☑ | +100 | N/A |

FIG. 5

☐ Prepaid Administration System

Your Financial Institution Payroll Card

Program Documents≠ Home≡ Help ∷ Sign out

| > Search For ... | > Card Sales | > Work Queues | > Manage Program | > Reports | > Risk Management |

Case Detail
Home > Fraud Queue > Buyer Case Detail        <Room for system messages>

| Tasks | |
|---|---|
| Work the Fraud Queue | |
| Case Detail | |
| Access Negative File | |
| Overview | |
| Reports | |

☐ Case Information
Card Program:   Your Financial Institution Reloadable Gift
Case Number:    333-123457
Case Status:    Open

☐ Buyer Information

| | | Negative File |
|---|---|---|
| Buyer Name: | Dr. John Doe | ☐ |
| Buyer Address: | 1111 Main St., Denver, CO 80233 | ☐ |
| Phone: | 303-123-4567 | Yes |
| Phone Type: | Home Phone | |
| Funding Accounts: | PAN: 0444505056664 | Yes |
| | Account Number: 12222244444 | ☐ |
| Email Address: | jsmith@email.com | ☐ |
| Government ID Type: | Social Security Number | |
| Government ID: | 123-222-2223 | ☐ |
| Date of Birth: | 02-26-1977 | |

[ADD TO NEGATIVE FILE]   [VIEW VERIFICATION RESULTS]

☑ Rules Triggered

| Cleared | Rule | Triggering Event | Last Note | Select |
|---|---|---|---|---|
| ✓ | Multiple Accounts enrolled with same Funding Account | Account: [description], 0444505056664<br>Threshold = 4 within 1 day(s)<br>Actual = 5 within 1 day(s)<br>Buyers: Dr. John Doe<br>Mrs. John Doe | 11-04-2004 10:31:25 ppc.pcteriet<br><br>Cleared rule based on Issuer's recommended actions | ○ |
| | Multiple Accounts enrolled with Buyer Address | Address: 1111 Main St., Denver, CO 80233<br><br>Threshold = 15 within 2 day(s)<br>Actual = 20 within 1 day(s) | 11-04-2004 10:31:25 ppc.pcteriet<br><br>Contact - | ○ |
| ✓ | Issuer Negative File Hit | Address: 1111 Main St., Denver, CO 80233 | 11-04-2004 10:45:15 ppc.pcteriet<br><br>Per Issuer address should remain on negative file. Determined that this card should be blocked for Fraud. | ○ |
| | Address Verification | [Display Explanation of result code from Experian Appendix C - ADDRESS VERIFICATION RESULT CODES (If the result code returned has been selected by the issuer to trigger a rule)] | | ○ |
| | Address Type Verification | [See note in address verification. But - Experian Authentication Services Appendix C - ADDRESS TYPE RESULT CODES] | | ○ |
| | High Risk Address | [See note in address verification, But - Experian Authentication Services Appendix C - ADDRESS HIGH RISK RES. CODES] | | ○ |
| | Phone Verification | [See note in address verification, But - Experian Authentication Services Appendix C - PHONE VERIFICATION RES CODES] | | ○ |
| | High Risk Phone | [See note in address verification, But - Experian Authentication Services Appendix C - PHONE HIGH RISK RES CODES] | | ○ |
| | OFAC Hit | [See note in address verification, But - Experian Authentication Services Appendix C - OFAC VERIFICATION RES CODES] | 11-04-2004 10:31:25 ppc.pcteriet<br><br>Placed call to Buyer for clarification of multiple orders from same address. No answer - left message. | ○ |
| | SSN Verification | [See note in address verification, But - Experian Authentication Services Appendix C - CONSUMER ID (SSN) RES CODES] | | ○ |
| | Driver's License Verification | [See note in address verification, But - Experian Authentication Services Appendix C - DRIVER'S LICENSE RES CODES] | | ○ |
| ✓ | Date of Birth Verification | [See note in address verification, But - Experian Authentication Services Appendix C - DATE OF BIRTH MATCH CODES] | | ○ |

FIG. 6

Prepaid Card System

[PRINT] [CLOSE]

| CASE INFORMATION | | | |
|---|---|---|---|
| Card Program: | Your Financial Institution Reloadable Gift | Buyer Name: | Jane Smith |
| Card Number: | 4122 6100 0000 0555 | Recipient Name: | John Doe |
| Card Status: | Fraud Lock | Available Balance: | $319.99 |
| Case Number | 333-123456 | | |
| Card Status: | Open | Assigned to: | ppc.pcteriet |

Rules Triggered

| Rule | Date & Time | Triggering Event |
|---|---|---|
| Address Velocity | 11-01-2004 18:00:21 | Threshold = 5 within 2 day(s) <br> Actual = 6 within 1 day(s) |
| Exists in Neg File | 11-01-2004 23:59:59 | Address, Phone |
| Load Source Velocity | 11-01-2004 23:59:59 | Threshold = 2 within 1 day(s) <br> Actual = 5 within 1 day(s) |
| OFAC | 11-01-2004 21:09:33 | OFAC: <br> Code 3 = match to SSN only |
| Patriot Act | 10-31-2004 19:56:00 | Patriot Act: <br> Address High Risk <br> Code YA = high risk business identified at this address |
| Recipient Phone Velocity | 11-01-2004 22:45:33 | Threshold = 3 <br> Actual = 5 |
| Rush Card, New Address | 11-01-2004 23:00:33 | Yes |

Negative File Information

| Element | Buyer | Negative Files Issuer | Recipient | Negative Files Issuer |
|---|---|---|---|---|
| Address: | 1111 Main St. Denver CO 80233 | ✓ | 1111 Main St. Denver, CO 80231 | ✓ |
| Phone: | 303-123-4567 | ☐ | 303-234-5678 | ✓ |
| Load Source: | 0504 3244 5776 0342 | ☐ | 4454 8452 1536 0377 | ☐ |
| Load Source: | | | 4454 8434 3456 3453 | ☐ |

Case History & Notes

| Date & Time | Action | Action By | Details |
|---|---|---|---|
| 11-11-2004 07:45:34 | Case Reassigned | System | Case assigned to ppc.pcteriet, who clicked on the unassigned case |
| 11-10-2004 22:45:34 | Case Unassigned | ppc.kkelly | Reassigned this case to "Unassigned" |

FIG. 7

Prepaid Administration System

Your Financial Institution Payroll Card

Program Documents :: Home :: Help :: Sign out

> Card Sales | > Work Queues | > Manage Program | > Reports | > Risk Management

▪▪ Add New Parameter Set
Home > Limits & Thresholds > Add New Parameter Set

- Overview
- Search Parameter Sets
- Audit Log
- Tasks
- Add New Parameter Set
- Compare Parameters <Room for system messages>

* Issuer: [- Select - ▼]
* Location: [- Select - ▼]
* Card Program: [- Select - ▼]

[SUBMIT]

FIG. 9

Prepaid Administration System

Your Financial Institution Payroll Card — Program Documents :: Home :: Help :: Sign out

| ▸ Search For... | ▸ Card Sales | ▸ Work Queues | ▸ Manage Program | ▸ Reports | ▸ Risk Management |

▪▪ Add New Parameter Set
Home > Limits & Thresholds > Add New Parameter Set     <Room for system messages>

Sidebar:
- ▽ Overview
- Search Parameter Sets
- Audit Log
- ▽ Tasks
- Add New Parameter Set
- Compare Parameters

* Issuer: [- Select -]   * Card Program: [- Select -]
* Location: [- Select -]   [SUBMIT]

New Rule Set Name: [Enter Name]   Effective Date (MM-DD-YYYY): 05 - 01 - 2005

Parameter Set
Setname:

Standard Limits and Thresholds
You can specify a single set of values for the following Limits and Thresholds. To deactivate a Limit or Threshold, set its values to blank. Note: Threshold values must be less than or equal to the corresponding limit value.

| Trigger | Type | Decline Code | Limit Overide by PAS User | Production Value | Production Period | New Settings Value | New Settings Period |
|---|---|---|---|---|---|---|---|
| # Accounts Purchased with same Buyer Address | Limit | 122 | ☐ Yes | 7 cards | in 4 days | 7 cards | in 3 days |
|  | Threshold | N/A |  | 4 cards |  | 3 cards |  |
| # Accounts Purchased with same Cardholder Address | Limit | 122 | ☐ Yes | 3 cards | in 4 days | 3 cards | in 3 days |
|  | Threshold | N/A |  | 2 cards |  | 3 cards |  |
| # Accounts Purchased with same Cardholder Phone | Limit | 122 | ☐ Yes | 7 cards | in 4 days | 7 cards | in 3 days |
|  | Threshold | N/A |  | 4 cards |  | 3 cards |  |
| Maximum # Cards in single Purchase | Limit | 122 | ☐ Yes | 14 cards |  | 3 cards |  |
|  | Threshold | N/A |  | 12 cards |  | 2 cards |  |
| Maximum $ Value of a Single Purchase | Limit | 122 | ☐ Yes | $5,000 |  | $5000 |  |
|  | Threshold | N/A |  | $3,000 |  | $3000 |  |
| Funding Account Usage | Limit | 122 | ☐ Yes | 14 cards | in 4 days | 3 cards | in 3 days |
|  | Threshold | N/A |  | 12 cards |  | 2 cards |  |
| Funding Account Total Purchase $ Amount | Limit | 122 | ☐ Yes | $5,000 | in 4 days | $5000 | in 3 days |
|  | Threshold | N/A |  | $3,000 |  | $3000 |  |
| Minimum Dollar Load Per Transaction | Limit | 122 | ☐ Yes | $20 |  | $35 |  |
|  | Threshold | N/A |  | $25 |  | $45 |  |
| Maximum Dollar Load Per Transaction | Limit | 122 | ☐ Yes | $10,000 |  | $5000 |  |
|  | Threshold | N/A |  | $5,000 |  | $4500 |  |
| Maximum Dollar Loads Per Day | Limit | 122 | ☐ Yes | $3,000 |  | $5000 |  |
|  | Threshold | N/A |  | $2,000 |  | $4500 |  |
| Maximum Account Balance | Limit | 122 | ☐ Yes | $3,000 |  | $5000 |  |
|  | Threshold | N/A |  | $2,000 |  | $4500 |  |
| Maximum Yearly $ contribution to a Health Savings Account | Limit | 122 | ☐ Yes | $10,000 |  | $5000 |  |
|  | Threshold | N/A |  | $5,000 |  | $4500 |  |
| Maximum Load Count | Limit | 122 | ☐ Yes | 5 times | in 2 days | 3 times | in 3 days |
|  | Threshold | N/A |  | 4 times |  | 2 times |  |
| Cash Withdrawal Single Transaction | Limit | 122 | ☐ Yes | $500 |  | $500 |  |
|  | Threshold | N/A |  | $400 |  | $450 |  |
| Purchase Limit - Single Transaction | Limit | 122 | ☐ Yes | $500 |  | $500 |  |
|  | Threshold | N/A |  | $400 |  | $450 |  |

FIG. 10

Prepaid Administration System

Your Financial Institution Payroll Card | Program Documents ⁑ Home ⁑ Help ⁑ Sign out > Search For... | > Card Sales | > Work Queues | > Manage Program | > Reports | > Risk Management

Add New Fraud Rule Set
Home > Risk Management > Add New Fraud Rule Set     <Room for system messages>

- Overview
  - Search Fraud Rule Sets
  - Audit Log
- Tasks
  - Add New Fraud Rule Set
  - Compare Rule Sets

* Issuer: [DPS - Default]    * Card Program: [- Select -]    [SUBMIT]
* Location: [Highlands Ranch Branch]

New Rule Set Name: [Enter Name]    Effective Date (MM-DD-YYYY): 05 - 01 - 2005

Fraud Rules with Single Triggers
You can set each trigger as on or off and modify its triggers.

| Rule | Production Trigger | | | New Settings | | |
|---|---|---|---|---|---|---|
| | Active | Value | Period | Active | Value | Period |
| Multiple Accounts enrolled with same Funding Account | ✓ | 7 accounts | in 4 days | ✓ | 7 accounts | in 3 days |
| Rush Card & Address Change | ✓ | Both Occur | in 4 days | ✓ | Both Occur | in 3 days |
| Rush Card & Name Change | ✓ | Both Occur | in 4 days | ✓ | Both Occur | in 3 days |
| Rush Card with Name Change & Address Change | ✓ | All Occur | in 4 days | ✓ | All Occur | in 3 days |
| Multiple Accounts opened with same Cardholder Phone | ✓ | 7 accounts | in 4 days | ✓ | 7 accounts | in 3 days |
| Multiple Accounts enrolled with same Address | ✓ | 14 accounts | in 4 days | ✓ | 3 accounts | in 3 days |
| Funding Amount Velocity | | | | | | |
| Funding Amount Velocity Days | ✓ | N/A | N/A | ✓ | N/A | N/A |

Fraud Rules with Multiple Triggers
You can set each trigger relating to this rule as on or off. Detail for all triggers will still appear in the Fraud case for reference purposes.

| Rule | Production Trigger | | New Settings |
|---|---|---|---|
| | Active | Trigger | Active |
| ▼ Address Verification | | | ✓ |
| | ✓ | A - Address ambiguous | ✓ |
| | ✓ | B - Match to business name - residential address | ✓ |
| | ✓ | B0 - Business name match - no confirmation | ✓ |
| | ✓ | B1 - Business name match - single source confirms | ✓ |
| | ✓ | B2 - Business name match - two sources confirm | ✓ |
| | ✓ | BB - Match to business name - business address | ✓ |
| | ✓ | BM - Match to business name - mixed use address | ✓ |
| | ✓ | E - Matching records exceed maximum defined in profile | ✓ |
| | ✓ | E0 - Error - no confirmation | ✓ |
| | ✓ | E1 - Error - single source confirms | ✓ |
| | ✓ | E2 - Error - two sources confirm | ✓ |
| | ✓ | F0 - Full name match - no confirmation | ✓ |
| | ✓ | F1 - Full name match - single source confirms | ✓ |
| | ✓ | F2 - Full name match - two sources confirm | ✓ |
| | ✓ | H - House number not found on street | ✓ |
| | ✓ | I - Incomplete or blank address | ✓ |
| | ✓ | IV - Invalid address | ✓ |
| | ✓ | N - No match to name - residential address | ✓ |
| | ✓ | N0 - No name match - no confirmation | ✓ |

FIG. 11

Rule Set Compare

Home > Risk Management > Rule Set Compare

Your Financial Institution Payroll Card

Prepaid Administration System

Program Documents :: Home :: Help :: Sign out

> Card Sales | > Work Queues | > Manage Program | > Reports | > Risk Management

<Room for system messages>

- Overview
- Search Rule
- Comparisons

* Issuer: Your Financial Institution

* Card Program: Your Financial Institution Reloadable Gift

File Type: All

Note: Rejected files are due to production Rule Set being modified during Compare Period.

File Status: All

[SEARCH]

| Comparison Set Name | Production Set Name | File Type | Status | From | To |
|---|---|---|---|---|---|
| New Setting | First Quarter 2006 | Limits/Thresholds | Complete | 06-15-2005 | 07-04-2005 |
| Test Settings 1 | First Quarter 2006 | Fraud Rules | Completed | 01-15-2006 | 01-21-2006 |
| December Test 1 | First Quarter 2006 | Limits/Thresholds | In-Process | 02-02-2006 | 02-15-2006 |
| 30 char Alpha Numeric | First Quarter 2006 | Fraud Rules | Completed | 01-15-2006 | 01-21-2006 |
| New Setting 2 | First Quarter 2006 | Limits/Thresholds | Complete | 06-15-2005 | 07-04-2005 |
| Test Settings 021505 | First Quarter 2006 | Fraud Rules | Completed | 01-15-2006 | 01-21-2006 |
| December Test 2 | First Quarter 2006 | Limits/Thresholds | In-Process | 02-02-2006 | 02-15-2006 |
| Test Settings 021505 | First Quarter 2006 | Fraud Rules | Completed | 01-15-2006 | 01-21-2006 |
| New Setting | First Quarter 2006 | Limits/Thresholds | Complete | 06-15-2005 | 07-04-2005 |
| December Test 2 | First Quarter 2006 | Fraud Rules | Rejected | 12-01-2004 | 12-31-2005 |

1 2 3    Next Page

FIG. 12

☐ Prepaid Administration System

Your Financial Institution Payroll Card     Program Documents ▪ Home ▪ Help ▪ Sign out

| > Search For ... | > Card Sales | > Work Queues | > Manage Program | > Reports | > Risk Management |

:: Limits/Thresholds View Compare Results   <Room for system messages>
Home > Risk Management > Rule Set Compare > View ☑ Overview
Search Rule Set Comparisons
> View Results Select All Locations Attached or a Single Location for Results: [All Attached Locations ▼]

| | | | |
|---|---|---|---|
| Issuer: | Your Financial Institution | Card Program: | Your Financial Institution Reloadble |
| Compare Rule Set Name: | Test Settings 1 | Production Set Name: | January Settings |
| File Type: | Limits/Thresholds | File Comparision Duration: | 30 Days |
| Start Test Date: | 03-01-06 | Ending Test Date: | 03-31-06 |

Locations Using this Set
Number of Locations: 350

Locations

| | | | |
|---|---|---|---|
| Augusta | Baltimore | Bangor | Bayport |
| Cleveland | Chicago | Dallas | Denver |
| Detroit | England | Frankfurt | Gainesville |
| Honolulu | Iverton | Jacksonville | Johnstown |
| Kansas City | Laporte | London | Louisville |
| Macon | Manasaas | Moore | New Orleans |
| Northfield | Oberlin | Portland | Prague |
| Quebec | Raleigh-Durham | Ralston | Rochester |
| St Louis | Talahassee | Trenton | Virgilville |
| Wauwautosa | Wilmington | Wright | Youngstown |

◁ Previous | First | Last | Next ▷

| Ref # | Trigger (note: need to add all Limits and thresholds supported. event the ones that are not Implemented should be shown) | Type | Production Set Value | Production Set Period | Comparison Set Value | Comparison Set Period | Difference Hits | Difference % |
|---|---|---|---|---|---|---|---|---|
| 1 | Times address used as purchaser address | Limit | 7 cards | in 4 days | 7 cards | in 3 days | N/A | N/A |
| | | Threshold | 4 cards | | 3 cards | | -230 | -19.0% |
| 2 | Times address used as recipient address | Limit | 3 cards | in 4 days | 3 cards | in 3 days | -100 | -4.0% |
| | | Threshold | 2 cards | | 3 cards | | 235 | 7.0% |
| 3 | Times phone used as recipient phone | Limit | 7 cards | in 4 days | 7 cards | in 3 days | 45 | -6.0% |
| | | Threshold | 4 cards | | 3 cards | | 43 | 5.8% |
| 6 | Maximum # Cards in single purchase | Limit | 14 cards | | 3 cards | | 525 | 12.0% |
| | | Threshold | 12 cards | | 2 cards | | 301 | 9.0% |
| 7 | Maximum $ Value of a Single Purchase | Limit | $5,000 | | $5,000 | | 79 | 6.1% |
| | | Threshold | $3,000 | | $3,000 | | -120 | -2.3% |
| 10 | Accounts reloaded by a single funding account over a period | Limit | 14 cards | in 4 days | 3 cards | in 3 days | -222 | -12% |
| | | Threshold | 12 cards | | 2 cards | | 23 | 1.4% |
| 11 | Value of reloads for a single funding account over a period | Limit | $5,000 | in 4 days | $5,000 | in 3 days | 190 | 6.4% |
| | | Threshold | $3,000 | | $3,000 | | 321 | N/A |
| 12 | Minimum reload value per account | Limit | $20 | | $35 | | -120 | N/A |
| | | Threshold | $25 | | $45 | | 15 | N/A |
| 13 | Maximum reload value per account | Limit | $10,000 | | $5,000 | | -99 | -3.6% |
| | | Threshold | $5,000 | | $4,500 | | 74 | 4.5% |
| 14 | Maximum Value reloads for a single account over a period | Limit | $3,000 | in 4 days | $5,000 | in 4 days | 74 | 4.5% |
| | | Threshold | $2,000 | | $4,500 | | 32 | 1.3% |

[PRINTABLE VERSION]

Prepaid Card System

[PRINT] [CLOSE]

| *Issuer: | Your Financial Institution | *Card Program: | Your Financial Institution Travel Money |
|---|---|---|---|
| *Location: | Highlands Ranch Branch | | |

| Choose Test Settings To Compare With Production: | Test Settings 021505 |
|---|---|

Test Data Range: From (MM-DD-YYYY): 05-01-2005    To (MM-DD-YYYY): 06-01-2005

| Limit or Threshold Name | Current Production Values | Values For This Set | Difference Hits | % |
|---|---|---|---|---|
| Account Volume Limit | $2,000.00 in 4 days | $2,500.00 in 4 Days | -210 | -17.0% |
| Account Volume Threshold | $2,000.00 in 4 days | $2,500.00 in 4 Days | -230 | -19.0% |
| Buyer Address Count Limit | 7 times in 4 days | 5 times in 4 days | -100 | -4.0% |
| Buyer Address Count Threshold | 4 times in 4 days | 4 times in 4 days | 235 | 7.0% |
| Cardholder Address Count Limit | 3 times in 4 days | 4 times in 4 days | 45 | -6.0% |
| Cardholder address Count Threshold | 3 times in 4 days | 4 times in 4 days | 43 | 5.0% |
| Cardholder Phone Limit | 3 times in 4 days | 2 times in 2 days | 525 | 12.0% |
| Cardholder Phone Threshold | 3 times in 4 days | 2 times in 2 days | 301 | 9.0% |
| Cash Withdrawal Time Limit | $2,000.00 in 4 days | $2,200.00 in 4 days | 79 | 6.1% |
| Cash Withdrawal Time Threshold | $2,000.00 in 4 days | $2,200.00 in 4 days | -120 | -2.3% |
| Cash Withdrawal Transaction Limit | $2,000.00 | $2,500.00 | -222 | -12% |
| Cash Withdrawal Transaction Threshold | $2,000.00 | $2,500.00 | 23 | 1.4% |
| Funding Account Count Limit | 14 cards in 4 days | 14 cards in 5 days | 190 | 6.4% |
| Funding Account Count Threshold | N/A | 4 times in 5 days | 321 | N/A |
| Funding Account Total Purchase Amount Limit | $5,000.00 in 4 days | $5,500.00 in 4 days | 120 | 3.4% |
| Funding Account Total Purchase Amount Threshold | $2,500.00 in 4 days | $2,500.00 in 4 days | 211 | 6.4% |
| Lost/stolen Limit | N/A | 4 times in 5 days | 15 | N/A |
| Maximum Contribution Limit | $10,000.00 in 1 year | $14,000 in 1 year | -99 | -3.6% |
| Maximum Account Balance Limit | $15,000.00 | $18,000.00 | 74 | 4.5% |
| Maximum Account Balance Threshold | $15,000.00 | $15,000.00 | 74 | 4.5% |
| Maximum Dollar Load Per Transaction Limit | $500.00 | $600.00 | 32 | 1.3% |
| Maximum Dollar Load Per Transaction Threshold | $500.00 | $600.00 | 33 | |
| Maximum Dollar Loads Per Day Limit | $500.00 in 1 day | $600.00 in 1 day | -254 | -9.0% |
| Maximum Dollar Loads Per Day Threshold | $500.00 in 1 day | $600.00 in 1 day | 321 | 3.2% |
| Maximum Dollar Loads Per Multiple Day Period Limit | $1,500.00 in 4 days | $1,800.00 in 4 days | 32 | 2.9% |
| Maximum Dollar Loads Per Multiple Day Period Limit | $1,500.00 in 4 Days | $1,800.00 in 4 days | 34 | 3.7% |
| Maximum Load Count Limit | 3 times in 3 Days | 3 times in 4 days | -54 | -4.2% |
| Maximum Load Count Threshold | 3 times in 3 Days | 4 times in 5 days | 144 | 6.7% |

FIG. 15

SYSTEM, APPARATUS AND METHODS FOR COMPARING FRAUD PARAMETERS FOR APPLICATION DURING PREPAID CARD ENROLLMENT AND TRANSACTIONS

CROSS REFERENCE TO RELATED APPLICATIONS

The present application is a continuation application of and claims priority to U.S. Non-Provisional application Ser. No. 11/757,985, now U.S. Pat. No. 7,627,522 filed on Jun. 4, 2007, the entire contents of which are herein incorporated by reference for all purposes.

TECHNICAL FIELD

This invention relates, in general, to fraud analysis in prepaid card systems, and in particular, to systems, methods and apparatus to optimize fraud platform parameters prior to implementation of the system.

BACKGROUND OF THE INVENTION

Prepaid card portfolios may be monitored for suspect buyers and cardholders. For example, a set of configurable parameters comprising limits and thresholds provide the system with a set of rules that are used to signal the possibility of fraudulent transactions. The parameters are run against a set of prepaid card production data including for example, card holder enrollment data, funding account data, issuance data (e.g., proper address) and usage or transaction data. Any number of variables, such as for example, an incomplete or blank address, an invalid address, no match to a name and an address, etc., may trigger one or more of the fraud parameters to yield a number of suspected fraud cases. When a possible instance of fraud is detected, a fraud case may be created, which may then be assigned to a fraud analyst for further investigation, and eventual disposition.

Although a particular set of fraud parameters may produce a set of suspected fraud cases, there may be times where an Issuer or Processor would like to adjust or tweak the thresholds and limits within the parameters and/or turn parameters on or off within the system to yield a different set of suspected fraud cases. However, application of different parameters may result in a large number of suspected cases and overwhelm the fraud management system, or may result in a large number of negative fraud cases, wherein time and resources may be wasted during investigation. There is no current method to compare parameters as applied to certain data to optimize a parameter platform prior to implementation.

Accordingly, as recognized by the present inventor, what is needed is a system and method for tracking how a change in the fraud parameters would affect the fraud cases that would result without having to actually move the new parameters into production.

It is against this background that various embodiments herein were developed.

SUMMARY

In light of the above and according to one broad aspect of one embodiment of the present invention, disclosed herein is a method for comparing a set of proposed or test fraud parameters to a set of control or production fraud parameters for prepaid device analysis such as prepaid card fraud analysis. In one example, the method may include creating a set of production fraud parameters for prepaid card fraud analysis, the set of production fraud parameters comprising at least one of a plurality of configurable limits, thresholds or rules that are used to signal one or more potential fraud cases; loading the set of production fraud parameters into a processing engine; running the set of production parameters against production data to produce a set of one or more suspected fraud cases triggered by the set of production parameters; changing one or more parameters within the set of production fraud parameters to create one or more sets of test fraud parameters for prepaid card fraud analysis; running the one or more sets of test fraud parameters against production data to produce a set of one or more suspected fraud cases for each set of test fraud parameters; and presenting suspected fraud cases triggered by each set of fraud parameters for comparison with the cases triggered by the production parameters.

According to another broad aspect of another embodiment of the present invention, disclosed herein is an apparatus for comparing a set of production fraud parameters with one or more sets of test or proposed fraud parameters run against prepaid card production data in a prepaid card analysis. In one embodiment, the apparatus may include a system for uploading a set of production fraud parameters and one or more sets of test fraud parameters; a processing engine for receiving the uploaded parameters for running production data against the set of production fraud parameters in tandem with the one or more sets of test fraud parameters to produce a set of suspected fraud cases triggered by each set of fraud parameters; and one or more databases integrated with or in communications with the processing engine for card validation.

These and other embodiments of the invention are described in further detail below.

BRIEF DESCRIPTION OF THE DRAWINGS

FIG. 3 illustrates an example of graphical user interface that may be provided for inputting prepaid card enrollment information in accordance with one embodiment of the invention.

FIG. 4 illustrates an example of a graphical user interface that may be provided in order to facilitate processing of a fraud parameter platform in accordance with one embodiment of the invention.

FIG. 5 illustrates an example of a graphical user interface that may be provided to configure a plurality of associated triggers in accordance with one embodiment of the invention.

FIG. 6 illustrates an example of a graphical user interface for use in assessing application of the fraud platform parameters to actual production data in accordance to one embodiment of the invention.

FIG. 7 illustrates an example of a graphical user interface for use in viewing the status of a fraud case in accordance to one embodiment of the invention.

FIG. 9 illustrates an example of a graphical user interface for use in accessing a configurable parameter set in accordance with one embodiment of the present invention.

FIG. 10 illustrates an example of a graphical user interface for configuring limits and thresholds for a new parameter set in accordance with one embodiment of the present invention.

FIG. 11 illustrates an example of a graphical user interface for configuring the triggers associated with a new fraud rule set in accordance with one embodiment of the present invention.

FIG. 12 illustrates an example of a graphical user interface for viewing the status of a rule set comparison in accordance with one embodiment of the present invention.

FIG. 13 illustrates an example of a graphical user interface for viewing the results of a parameter set comparison in accordance with one embodiment of the invention.

FIG. 14 illustrates an example of a graphical user interface for viewing the results of a rule set comparison in accordance with one embodiment of the invention.

FIG. 15 illustrates an example of a graphical user interface for comparing the number of hits triggered by limits or thresholds for current production values and a set of comparison values.

DETAILED DESCRIPTION

Figure 1:
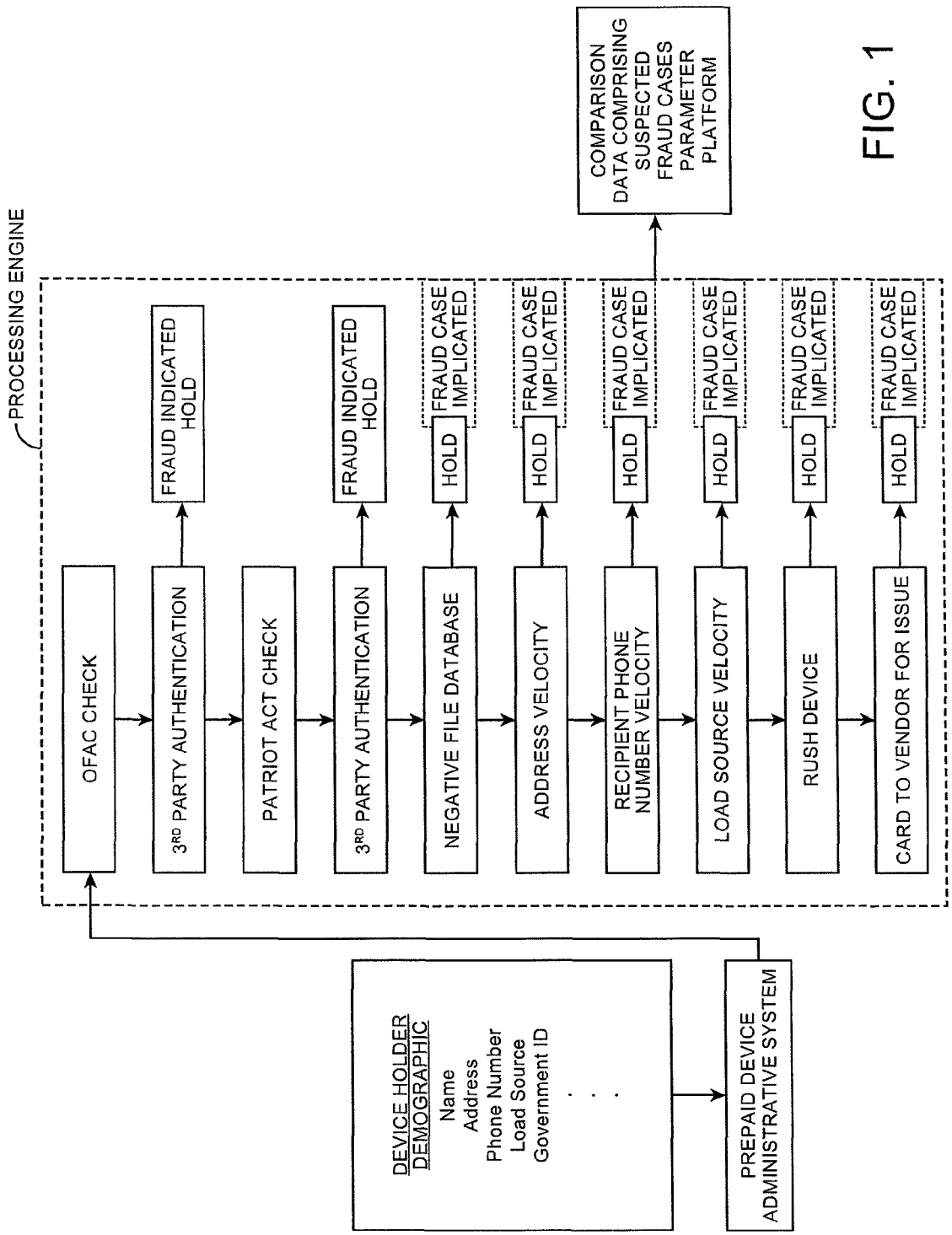
FIG. 1 illustrates a block diagram of an example of a system for processing one or more proposed fraud platforms in tandem with a production fraud platform in accordance with one embodiment of the present invention.

Methods used to detect fraud in credit card type transactions are not generally effective in a prepaid card environment. Because the prepaid card Issuer is selling a product and not extending credit, credit scores alone are generally not applicable. However, information associated with the credit scores may be used, as described further herein. Similarly, back-end transaction fraud detection strategies often rely on historical data to highlight out-of-character transactions, and the number of transactions associated with a typical prepaid card may not meet the requirements for an accumulated transaction history.

There are generally three types of fraud in the prepaid environment. Roaming fraud, where an individual supplies demographic data including for example, name, address, government ID, that are not their own in an attempt to defraud the Issuer by enrolling under an alias. Load fraud, where an individual with an otherwise legitimate card loads from a stolen or other fraudulent source, e.g., a stolen credit card. Transaction fraud, where an individual uses various methods to fraudulently use a card at merchants, ATMs and other POS transactions.

A set of fraud parameters may be provided comprising defined limits, thresholds and rules designed to isolate suspect card activity. As explained further below, the parameters may be run against prepaid card production data to trigger potential fraud cases. Once certain cases are triggered, a fraud management system may be used to determine appropriate courses of action.

In particular, a collection of Issuer and/or processor defined rules, limits and thresholds may be applied to isolate suspect activity. However, certain configurations of the rules, limits and thresholds may trigger an undesirable outcome of suspected fraud cases. For example, an excessive number of fraud cases or an inordinate number of false indicators of fraud cases. For this reason, it would be beneficial to preview the outcome of application of a set of rules, limits and thresholds before moving into actual production.

Embodiments of the present invention provide for a side-by-side comparison of an implemented fraud parameter platform versus a test fraud parameter platform to determine and understand how the differences between the different platforms cause the suspected fraud cases to be triggered. Embodiments of the present invention may provide an opportunity for an Issuer to test a fraud parameter platform prior to implementation in order to assess whether the outcome produced, i.e., the number and type of suspected fraud cases, are in accordance with the number and type of cases desired. Various embodiments of the present invention are described herein, and may be implemented as methods, systems, apparatus or in other forms.

Cards are discussed in detail. However, other types of prepaid devices such as fobs, phones, etc. are also encompassed by embodiments of the invention. As used herein, the term "card" includes but is not limited to, for example, bank cards, prepaid, preloaded or prefunded cards, such as general purpose reloadable cards, travel cards, payroll cards, teen or student cards, commercial cards, gift cards, or any other type of preloaded, prefunded or prepaid conventional payment card that a customer can use in lieu of a cash payment, and these terms are used interchangeably herein. The term "transaction" includes but is not limited to bill pay, point-of-service purchase, ATM withdrawal, balance inquiry, or any other purchase type activity through prepaid card usage. The term "cardholder" includes but is not limited to, for example, a cardholder of any type of credit card (as that term is used herein), a customer or account holder, and these terms are used interchangeably herein. The term "Issuer" includes but is not limited to a bank or other financial institution that issues the prepaid cards. The term "prepaid card processing network" or "processing network" includes but is not limited to an electronic payment system, or any conventional network or system for authorizing or processing electronic payments and/or settling such payments between entities in a prepaid card system. The term "processor" means a business entity, acting as an agent of a financial institution that provides authorization and settlement of services. In various embodiments, Processors may connect to the processing network and may manage activities for a member.

In accordance with one embodiment, FIG. 1 illustrates an example of a block diagram for processing one or more test fraud platforms in tandem with a production fraud platform in order to assess how the differences within each platform cause different fraud cases to be triggered. In FIG. 1, the system may include a network processor comprising an administration system an a processing engine. In a further embodiment, a fraud processing engine may be integrated with or in communications with one or more databases that may be used to verify information associated with a prepaid card.

As illustrated in FIG. 1, in one embodiment, a card holder provides certain demographic information to a prepaid card administration system. Such information may include, for example, card holder name, address, phone number, load source, government ID, etc. The demographic information is uploaded to a processing engine. In another embodiment, an Issuer communicates with a network processor to configure one or more fraud platform parameters. The configured platforms may be named or assigned a designation and uploaded to the processing engine.

The processing engine runs production data received from the network processor on the implemented production fraud parameter platform (as shown in the solid lines) and in tandem runs the same production data on the one or more test parameter platforms (as shown with the dashed lines behind the production parameter platform) and compares the fraud cases triggered for each test fraud platform with the cases triggered for the production fraud platform. During processing, the fraud processing engine may further run the production data against a negative file database or another third party database.

In one embodiment, one or more test fraud parameter platforms or test rule sets may be designed by configuring a template of configurable parameters. In another embodiment, one or more test rule sets may be designed by altering an existing production fraud parameter platform such that the test fraud parameter platform is based on the production fraud parameter platform. A method for prepaid card fraud and risk management is disclosed in U.S. patent application Ser. No. 11/757,893, now U.S. Pat. No. 8,165,938 entitled "Prepaid Card Fraud and Risk Management," the entirety of which is incorporated herein by reference. Configuration of a fraud platform is discussed generally herein.

Figure 2:
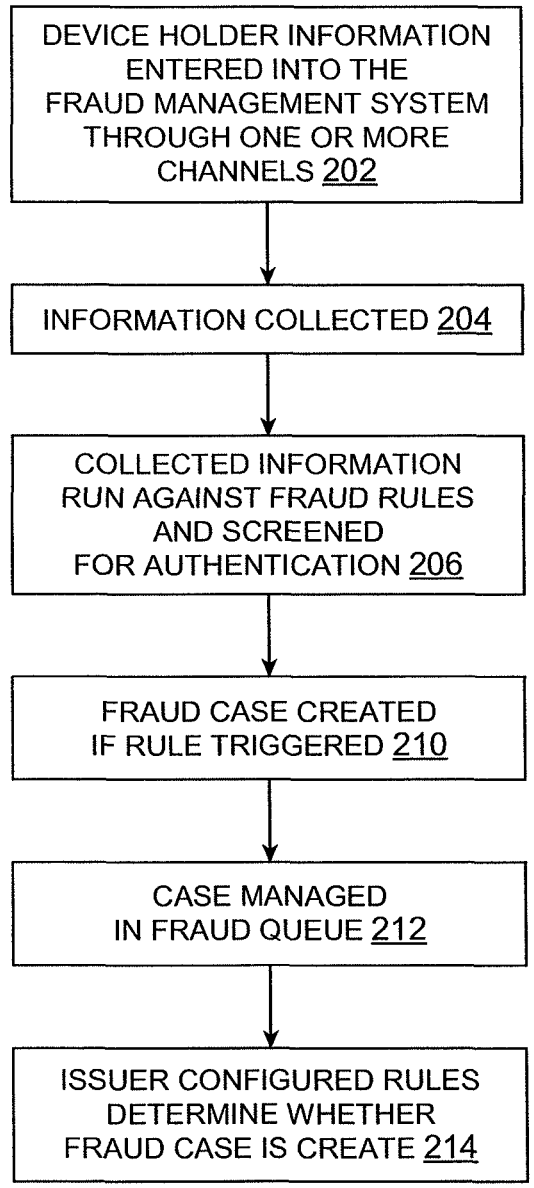
FIG. 2 illustrates an example of logical operations for creating a configurable set of fraud parameters in accordance with one embodiment of the present invention.

In accordance with one embodiment, FIG. 2 illustrates an example of logical operations for providing fraud management in a prepaid card environment. In a first operation, card holder information is entered into the fraud management system through an appropriate channel. In one example, a consumer web site may comprise a graphical user interface to provide a series of fields that may be used by the consumer to enter card holder information. The web site may further be configured to accommodate the look, feel and branding of an Issuer. An example of a GUI for card holder information is illustrated in FIG. 3 for a gift card. As shown in this example, the Issuer requires a name, address, phone, date of birth, government identification number, personalized question (for security purposes) and email address.

In another example, card holder information may also be entered into a system through an application such as, prepaid administration application. For example, employers may do bulk enrollments or individual enrollments for new commercial or payroll card holders. Thus, employers input the required information. Although not specifically enumerated, it will be recognized that additional forms of data entry are contemplated herein.

Referring again to FIG. 2, in a second operation the card holder information may be collected. In a third operation, the collected information may be run against fraud rules and screened for authentication. During this step, an attempt is made to verify the information provided by the card holder. To verify, the information may be compared against a third party database or an internal database of known fraud cases, e.g., a negative file database, as explained further below.

In general, validation is an attempt to identify information provided by the cardholder that may be invalid, or does not exist. In one example, information requiring verification is sent out to a credit reporting service and cross referenced with the agency database. For example, the address may be cross checked to make sure the inputted address is not high risk such as a hospital address; a jail address; or an incomplete apartment address. Verification may also be used to identify addresses that use a business address as a residential address. In a further embodiment, high risk geographical areas may be flagged based on statistically probable mail fraud risk.

In one embodiment, a third party database such as a credit reporting/scoring database may be accessed to verify the card holder demographic information. In one example, the database may be used to validate and verify one or more pieces of information in combination. For instance, the name, address and birth date may be evaluated to see if these separate pieces of information comport with each other. If the information does not comport, for example, if a piece of information does not match the information provided in the database, each piece of information may be analyzed separately through one or more additional databases including additional third party databases. For example, the phone number is run against one or more databases to determine whether it is high risk, legitimate, a business number, a high risk industry, mismatched area code and number, or simply a random number, etc. In some cases, where completely random data has been fully or partially entered into the system, a fraud case may be triggered and the fraudulent data checked against the negative file database. The data may further be added to the negative file database to trigger additional suspected cases.

In a further embodiment, a social security number database may be accessed and compared with the card holder data. A rule may be triggered if, for example, the social security number has been reported deceased or if the date of birth does not match the social security number. In a further embodiment, the card may be flagged because the social security number has been flagged as high risk in the database.

In a further embodiment, Office of Foreign Asset Control (OFAC) compliance may be provided and configurable by the processor or Issuer. For example, one or more pieces of information such as social security number, name, date of birth, and year of birth may be provided to a third party database for screening. In one embodiment, the information is provided through an XML interface. The third party may then run the data provided against their database and send a reply. The Issuer receives the reply and based on the reply and Issuer rule configuration, determines if the attempt passes OFAC screening. In a further embodiment, the system may be configured so that each element submitted for verification will return a verification case, so that if there is a match the account is placed on hold according to the fraud rule triggered.

In a further embodiment, the system may provide for an optional periodic screening, where the period may be measured in days, weeks, months, etc., for all accounts on the prepaid platform. Such screening may be effective in continued monitoring due to continual updates to the database and the potential for cardholders who have a card that may become a new entry within the OFAC database.

In one embodiment, the updated database may be provided to the Issuer or processor on a periodic basis. The updated database may be run against the card holder information on the prepaid platform and positive matches reported. The search results may be used to create new fraud cases with the information forwarded to the fraud queue for resolution. Depending on the rules, action may or may not be taken on the account prior to resolution.

In still a further embodiment, the system may provide Patriot Act compliance. The Patriot Act is the title of the Federal regulation requiring banks to verify the identity of any person seeking to open an account to the extent that it is reasonable and practicable. In one embodiment, the Issuer may require Patriot Act compliance. The processor may verify the information via a third party for both the card holder and the buyer by providing information to be run against the third party database. For example, name, residence street address, date of birth, social security number, drivers license and state of issuance, and other subject identifying information. Once the card holder information is collected, the data can be standardized and verified in-house or with a $3^{rd}$ party database for example, via an XML interface.

In one embodiment, the data is submitted to a third party database for validation. Once validated, the third party database sends the reply to the Issuer or processor who can, based on the reply, determine if the enrollment attempt has passed the Patriot Act based on the configured rule.

In a further embodiment, the information associated with the Patriot Act checks can be stored as required under the Patriot Act. In various embodiments, a field may be added to the database for Patriot Act verification. Further, accounts may be rescreened as any card holder data is amended. If on rescreening there is a match to the database, a fraud case may be created.

Referring again to FIG. 2, in a fourth operation, if any of the rules configured within the fraud parameters trigger on a system match to any of a plurality of databases, a fraud case file may be created. In a fifth operation, the case file may be promoted to the fraud queue and managed by the processor or Issuer. In a sixth operation, the parameters may further be configured to direct the Issuer to place the enrollment on hold, or in some cases to allow the card to issue even if some fraud rules were triggered. In one embodiment, the Issuer may configure on a rule-by-rule basis whether or not a case is created based on the results that come back from the card holder data verification.

In operation, in the prepaid card system, the Processor may be responsible for developing and maintaining a fraud and risk management system that is designed for the unique features associated with a prepaid product. In a further embodiment, the Processor may assist the Issuer in managing fraud by providing configurable products and services based on the card program and card type. In various embodiments, a fraud management system may combine industry standard fraud tools, with products and services specifically designed for prepaid products. The system comprises tools to reduce fraud by monitoring and identifying for example, suspect card buyers and recipients, fraudulent enrollment attempts, suspect funding transactions, and suspect transactions.

In one embodiment, a prepaid fraud and risk management system functionality is configured during implementation of a card account or card program. Configurable parameters provide the system with a set of rules that are used to signal the possibility of fraudulent transactions. Because a single violation of one of these parameters does not necessarily signal a fraudulent account, the system provides a wide array of fraud monitoring parameters that collectively create a cohesive, multi-layered fraud management system. These parameters may comprise separate categories such as, limits, thresholds and rules.

According to one embodiment, system access may be accommodated through an administration system. For example, the administration system may comprise a browser based application for managing a prepaid card programs' back-office and account maintenance functions, for example, account enrollment and issuance, account maintenance, cardholder customer service, funds management, fraud management and card inventory management.

In various embodiments, fraud rules may be used for example, when the buyer/recipient address is initially entered during the card purchase process via the consumer website; when the Buyer/recipient address is modified by the buyer/cardholder via the consumer website; when the buyer/recipient address is initially entered during the registration process via a type of administration system; when the buyer/recipient address is modified via a type of administration system; when the primary buyer address (not billing address) is initially entered during the buyer profile set-up/process in the consumer website; when the primary buyer address located in the buyer profile is modified by the buyer via the consumer website; when the Buyer address located in the buyer profile is modified via an administration system; when the buyer billing address is entered during the card purchase process; when the buyer billing address is entered or modified by the buyer in the buyer profile (update billing information) function; or individual card orders entered via an administration system.

In one embodiment, the tools may be parameter driven and configured based on the risk tolerance level of the institution.

In one example, some fraud mitigation tools may include for example, front end enrollment screening, OFAC and Patriot Act checking, transaction monitoring, fraud and flash fraud rules, limits and thresholds, and fraud queue monitoring and analysis.

In one embodiment, set-up of the fraud platform parameters provides the foundation for the program upon which downstream products and services will be based. The parameters are configurable and may comprise one or more separate categories to provide a wide array of fraud monitoring parameters including for example, limits, thresholds and rules. Although a single violation of a parameter or threshold may indicate a fraudulent account, in various embodiments it is a combination of factors that may signify a likely fraudulent account.

In one embodiment, a prepaid fraud and risk management system may comprise a set of configurable parameters that are key indicators of potentially fraudulent enrollment attempts. The parameter platform may comprise a series of default rules configured by a Processor or other third party. The platform may be provided to the Issuer. The Issuer may then further define the limits and thresholds associated with a particular rule. A scoring model may further be provided to an Issuer with a method to detect, identify and take action on potentially fraudulent transactions. For example, based on a number of events, a score may be produced and in combination with an Issuer defined threshold, an account may be identified as potentially fraudulent. The Issuer may then be alerted to the potentially fraudulent account.

In one embodiment, platform parameters may be defined, for example, certain rules selected and limits and thresholds defined by the Issuer and set by the Processor during card program implementation. Platform parameters may be run against production data such as card holder enrollment data, funding account data, issuance data (e.g., proper address) and usage or transaction data to determine how the rule will trigger suspected fraud cases.

In another embodiment, thresholds may be associated with each parameter. In many instances, an individual will conduct a fraudulent transaction just below the platform parameter in an attempt to mask their transactions. Fraud threshold settings are available for one or more limits and are intended to allow Issuers the ability to identify transactions that occurred just below the limit established by the parameter. In one example, the fraud threshold and the corresponding limit are associated with each other and may then have the same reset period and the same applied to dates. In operation, when one of the program parameters with an established limit or threshold has been reached or exceeded, a rule is triggered to alert the Issuer.

In one example, the platform limits or thresholds may be based on a rolling period of time defined as a number of days. Based on the type of limit or threshold, the Issuer can set up numerous limits or thresholds to allow for differentiation between daily, weekly and monthly limits defined as days. In a further example, each limit or threshold may have the same effective date. In this way, an Issuer may change limits that will change how their program performs in production.

FIG. 4, described below, illustrates an example of a graphical user interface that may be provided in order to facilitate processing of the fraud parameter platform on the prepaid system. As illustrated in FIG. 4, in one embodiment, a scalable and configurable prepaid fraud platform may be provided. The prepaid fraud platform may comprise a set of flexible, parameter driven features and functions tailored to particular business types and various prepaid card types. The parameter set may comprise a series of triggers further defined by associated limits and thresholds that may be set by the Issuer and/or the Processor. In a further embodiment, the triggers are configurable by activation or deactivation. In another embodiment, as shown in FIG. 4, multiple sets of values may be specified for at least some limits and thresholds.

Referring to FIG. 4, in one example, one trigger is defined by the number of accounts purchased with the same buyer address. In operation, according to FIG. 4, when 7 or more cards are purchased with the same buyer address or when the threshold of 4 cards purchased for the same buyer address is reached, a rule is triggered to alert the Issuer of a suspected case of fraud. The intent of the threshold is to find transactions that are below the parameter limit but are still suspect. Although further triggers and associated limits and thresholds are shown in FIG. 4, it will be recognized by one of skill in the art that this example is not meant to be encompassing of all possible fraud triggers.

In various embodiments, limits can be placed on enrollment of the prepaid cards. In one example, enrollment limits may be established at the Issuer card program type level and may further be overridden by an appropriate entity (e.g., a sub-client such as a merchant). For example, a buyer address may have an account limit applied to it through one of the parameters. The Issuer may place a limit on the number of card accounts which may be purchased within a specified number of days with the same buyer address. If the account exceeds the limit the buyer is notified and the purchase is declined.

In a further embodiment limits may be placed on the recipient address account. For example, an Issuer may place a limit of the number of card accounts which may be purchased within a specified number of days with the same recipient address regardless of buyer or funding source. If the account exceeds the limit the purchaser may be notified and the purchase may be declined.

In a further embodiment, a limit may be placed on the recipient phone number. For example, the Issuer may limit the number of accounts which may be purchased within a specified number of days with the same recipient telephone number regardless of buyer or funding source. If the account exceeds the limit the purchaser may be notified and the purchase may be declined.

In another embodiment the Issuer may define the initial purchase and value load platform parameters and limits. In one example, funding and/or re-load limits and initial purchase limits may be separated into two distinct sets of limits and thresholds. For example, a limit may be placed on the number of cards that can be purchased in a single order session. In addition, a limit may be placed on the maximum value for a single purchase request, i.e. the total dollar amount that can be purchased within a single purchase order or session.

In a further example, the Issuer may place a limit on the number of pre-paid cards in a single funding account that may be purchased within a specified number of days. If the account exceeds this limit the purchase may be declined. In another example, an Issuer may place a limit on the funding account total purchase amount. In this example, a limit may be placed on the total cumulative dollar amount of pre-paid cards in a single funding account that may be purchased within a specified number of days. If the cumulative total amount exceeds this limit, the purchaser may be notified and the transaction may be declined.

In a further example, the Issuer may place a minimum dollar balance per card per purchase limit. If the initial purchase amount is below the minimum the buyer may be notified and the transaction may be declined. In another example, the Issuer may place a limit on the maximum dollar balance per card per purchase in this example. If the initial purchase amount is above the maximum, the buyer is notified and the transaction may be declined. In one embodiment, the limit cannot exceed the maximum balance allowed on a per card balance.

In a further embodiment the Issuer may place re-load limits on the pre-paid cards. For example, the Issuer may place a minimum re-load amount per transaction on the card. In this embodiment, if the re-load amount is below the minimum the cardholder/account holder is notified and the transaction may be declined. In another example, the Issuer may place a limit on the maximum re-load amount per transaction. If the re-load amount is above the maximum the cardholder/account holder is notified and the transaction may be declined. In another example, the Issuer may place a limit on the maximum re-load amount per day. In this example, if the total dollar amount of all loads attempted during one calendar day is above the maximum the cardholder/account holder is notified and the transaction may be declined.

In another example, the Issuer may place a limit on the maximum re-load amount per multiple day period on the pre-paid card. In this example, if the total dollar amount of all loads attempted during a period defined as multiple days is above the maximum the cardholder/account holder is notified and the transaction may be declined. In another example, the Issuer may place a limit on the maximum account balance allowed at anytime. If the total dollar amount of any load or purchase exceeds the maximum the transaction is declined.

In a further example, an Issuer may place a limit on the maximum contribution. The contribution limit may be calculated based on a calendar basis. For example, the maximum account balance may be based on yearly basis and the contribution reset at the beginning of each year. Funds can roll over from the previous year and it does not impact the maximum contribution limit. The amount can be reset on a calendar basis.

In a further example, an Issuer may place a limit on the maximum re-load count. In this example, the total number of re-loads allowed per day, week and/or month is defined as days. If the cardholder has exceeded the number of loads permitted in the defined time period the account holder is notified and the transaction may be declined.

In a further embodiment, the fraud parameters may further comprise transaction processing parameters. Transaction processing parameters may include for example, cash withdrawal, transaction limits, cash withdrawal time limits, purchase limits, purchase time limits, aggregate dollar velocity limits such as the total aggregate dollar velocity of cash and goods/purchase transactions that includes funds spent at a merchant or ATM including OTC (over the counter), Cashback, signature and PIN transactions, lost stolen limits and limit overrides. As used herein, cash withdrawal may refer to for example, ATM withdrawals, manual teller cash withdrawals or cash back at the point of service. Limit overrides allow the Issuer to determine which limits may be overridden by administration system override functionality.

Some examples of enrollment threshold settings include but are not limited to buyer address account threshold, that is the number of accounts that may be purchased within a specified number days with the same purchaser address; recipient address account threshold, that is the number of accounts that may be purchased within a specified number of days within the same recipient address; and recipient telephone number account threshold, that is number of accounts that may be purchased within a specified number of days within the same recipient telephone numbers. In another example, initial purchase threshold settings may include but is not limited to maximum cards for a single purchase threshold; maximum value for a single purchase request; funding account purchase account threshold; funding account total purchase amount threshold; and maximum dollar balance per card purchase threshold. Re-load threshold settings may include for example, re-load amount per transaction threshold dollar loads per day threshold, dollar loads per day threshold, dollar loads per multiple day period, account balance threshold, load count threshold, funding account decline threshold. Transaction threshold settings may include for example, cash withdrawal transaction threshold, cash withdrawal time threshold, purchase threshold, purchase time threshold, aggregate dollar velocity limit, that is the total aggregate dollar velocity of cash and goods or purchase transactions that includes funds spent at a merchant or ATM which includes ATM OTC (over the counter), cash back signature and pin transactions. The total transactions may further be defined, for example defined in days and lost or stolen card threshold.

In addition to the platform parameters, in one embodiment as shown in FIG. 5, the platform further supports a number of defined fraud rules that function to highlight potentially fraudulent enrollment attempts and active accounts. Each rule may further comprise one or more triggers. Each rule is configurable by activating or deactivating one or more triggers within the rule.

Referring to FIG. 5, the rule shown is address verification. Within the rule, are a number of triggers. For example, address ambiguous, match to business name—residential address, business name match—no confirmation, etc. Each of these triggers further comprise a field to activate or deactivate the trigger and thus further configure the rule.

FIG. 6 shows an example of a graphical user interface for use by the Issuer or Processor in assessing application of the fraud platform parameters to actual production data. It is understood that these examples are provided as examples only and that various embodiments of the present invention may or may not include one or more features shown therein. Sample display screen may include a number of fields showing case information including buyer demographic information, for instance, buyer address, phone, phone type, funding account or accounts, email address, government ID type and number, and date of birth. The user interface may further include fields that enable adding the case information to a negative file or to viewing of verification results. The display screen may further include a section for viewing the rules, triggering events for the rule and notes related to the fraud case file. For example, in FIG. 5, the rule "multiple accounts enrolled with the same funding account" was triggered by exceeding the threshold of 4 cards within 1 day by the actual value of 5 cards within 1 day. Under the notes, the rule was cleared based on the Issuer's recommended actions.

FIG. 7 illustrates another example of a graphical user interface for use by the Issuer or Processor in viewing the results or status of a prepaid card system fraud case. The sample display screen may include a display of case information, rules triggered, negative file history and case history and notes. The case information field may be used to show for example, the card program, card number, card status, case number, and case status. The rules triggered field may be used to show for example, the rule triggered, the date and time that the rule was triggered and the triggering event. For example, as shown the address velocity rule was triggered at 18:00:21 on Nov. 1, 2004 because the threshold of 5 cards within 2 days was exceeded.

Fraud Comparison

In various embodiments, the Issuer may reconfigure the production parameters to create one or more test parameters. Each test set may be run against the production data to see if the production data triggers a different set of suspected fraud cases than were triggered with the production parameter set. An Issuer can configure the fraud rules according to their risk strategies. For example, a rule may place a limitation on the number of card accounts that can be purchased within a specified number of days with the same buyer or recipient address. In this example, the Issuer may configure the number of card accounts and the number of days that will violate the rule.

Figure 8:
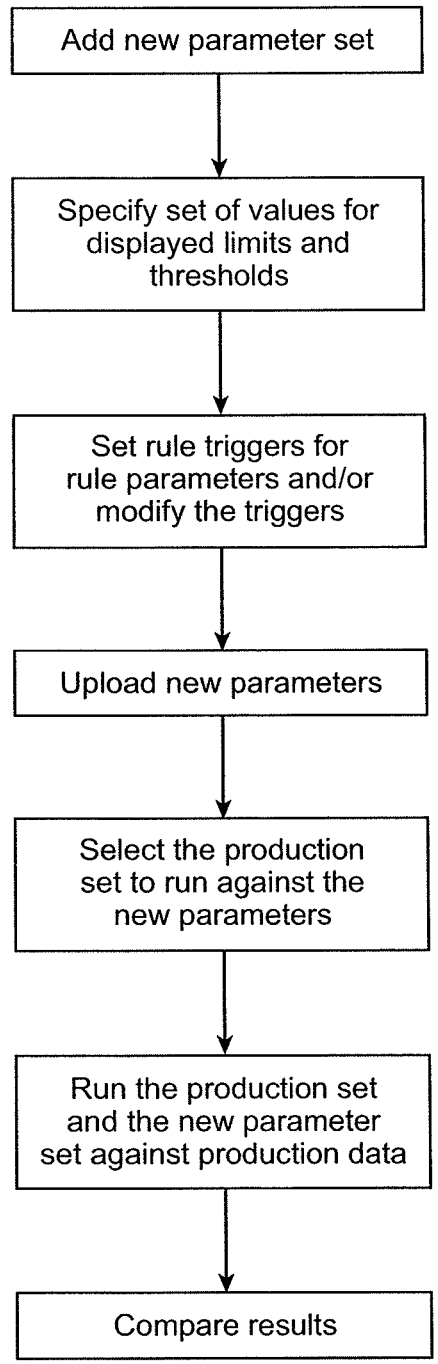
FIG. 8 illustrates an example of logical operations that may be performed in configuring one or more test parameters in accordance with one embodiment of the invention.

FIG. 8 illustrates an example of logical operations that may be performed in configuring one or more test fraud parameters. In a first operation, a graphical user interface may be used to select a base set of fraud parameters or parameter set. FIG. 9 illustrates an example of a graphical user interface which the Issuer or processor may access to select a configurable parameter set. The GUI may comprise a series of fields including Issuer, Location and Card Program.

Referring to FIG. 8, in a second operation the Issuer may specify a set of values for the displayed limits and thresholds. FIG. 10 shows an example of graphical user interface comprising a configurable parameter set. In one embodiment, the test parameter set is named to distinguish from other sets. The set comprises a series of triggers, for example, number of accounts purchased with the same buyer address, number of accounts purchased with the same cardholder address, number of accounts purchased with the same cardholder phone, etc. Associated with each trigger is a configurable limit and threshold. The parameter set may further comprise a comparison between the production set and the test set defined by value assigned and period applied.

For example, as illustrated a trigger may be defined as the number of accounts purchased with the same buyer address having the associated limit for production defined as 7 cards in 4 days with a threshold of 4 cards in 4 days. The production values are compared to the test set which defines the limit as 7 cards in 3 days with a threshold of 3 cards in 3 days.

In a further embodiment, a test rule set may be configured. As illustrated in FIG. 11, the rule parameters provide for a series of fraud rules with triggers. For instance, a rule may be multiple accounts enrolled with the same funding account wherein, as defined in the production set, the rule will trigger with 7 accounts enrolled in a 4 day period. The test set is configured to trigger the rule when 7 accounts are enrolled in a 3 day period. Each rule set may be run against production data and the results compared to determine whether the test rule set should be moved into production.

In a further embodiment, each rule may be defined by a plurality of triggers. The rule set may be dynamically configured by the Issuer setting each trigger that relates to the rule on or off. In a further embodiment, the triggers may still be viewed regardless of active status.

Once the fraud parameters have been configured, the Issuer may be provided with the ability to compare a draft or test rule set against production data and view the results via a graphical user interface accessed through a type of system administrator. In one embodiment, the fraud rule sets may be supported for limits/threshold and fraud rules as explained above. In a further embodiment, a fraud rule set may be defined at the card program level with entity overrides.

In one embodiment, creation and submission of a fraud rule set may be coordinated and implemented off-line or on-line. Once a test rule set is entered, a time is entered for the comparison program to be initiated. Once initiated, the comparison will occur for a predetermined number of days as defined by the Issuer. In one embodiment, an Issuer can begin to analyze and view the information resulting from the comparison as soon as the comparison begins by accessing a graphical user interface. As shown in FIG. 12, the example display screen may provide information as to the status of a comparison, for example, in process, complete or rejected. The display may further provide an action, for instance, check back later, view report or compare cancelled. The screen view may further include a section designating whether a particular screen is selectable and whether the results may be viewed and compared. Each status may further be associated with a status description, for example, rule set is in compare mode and is processing data against production.

In one embodiment, a test rule set is compared with a selected production rule set. In this embodiment, the test rule set and the production rule set are run against the same set of production data and the results compared.

In an alternate embodiment, a test rule set may be compared against another test rule set. In this embodiment, each rule set is run in tandem against the same set of production data and the results compared.

In one example, the production rule set and the test rule set are run in tandem as shown in FIG. 1. It is generally preferred to run a limited number of rule sets per program in compare mode at one time having an unlimited number of rule set comparisons existing in the Queue. However, it is recognized by the inventors that larger numbers of comparisons could be run coincidentally and these embodiments are included herein.

In one example, the response to submission of the production rule set for comparison with one or more test or comparison rule sets comprises all data that the user interface will need in order to view the results. In one embodiment, within a graphical user interface (GUI) screen, there is a tab for rule set comparison. In one example, various security applications may be in effect to assure that only authorized individuals may view the results of the comparison. In a further embodiment, access of the results may limited to view only mode.

In one embodiment, the results of the rule comparison are associated with an Issuer or card program. In an additional embodiment, past comparisons may be viewed as stored in a history of all rule set comparisons.

In one embodiment, the system may display information with respect to the rule set comparison work queue upon completion of the comparison. In one example, both in-process and completed comparisons may appear in the queue. The comparisons may further comprise data related to the comparison, for example, a comparison set name, a reference set name, a type (e.g., limits/threshold, or fraud rules), a comparison run duration, comparison status, and a results link. Comparison data may be selected and printed for viewing by authorized users.

In another embodiment, the GUI may be configured to facilitate viewing of status of the fraud comparison. In one example, files with a complete or rejected status may be automatically removed according to a predefined period. In another example, the removed files may be stored in an associated database.

In a further embodiment, the screens for viewing the comparison data may further accommodate manipulation and sorting. For example, once a comparison is selected, a user can modify the results screen to either show all of the locations that are attached to a specific rule set or filter the results so that only one of the locations attached to the program is shown. It is further contemplated that a user may select only some of the attached locations.

In a further embodiment, the search screen or GUI for the comparison process may be modified to accommodate viewing of the comparison results. In one example, a location and card program may first be selected. The search may be performed by accessing the fraud rule set by name or location. The database field may further be modified to comprise fraud rule reference numbers as an alternate to the name or location. Data may further be associated with the rule set including for example, the name of the fraud rule set, the date the fraud rule set was placed into production, and the locations attached to the rule set. A full set of default fraud rules may further be displayed further comprising fields in which to turn the rules on or off. Alternatively, the screen may be configured to display only the codes that are turned on or turned off, respectively. In a further embodiment, the search screen may communicate automatically or manually with a third party or a database through an XML or compatible interface to verify that the fraud rules are current.

In another embodiment, an additional search screen for a limit/threshold rule set may be modified and implemented. In one example, a location and card program is selected. Based on the selection, the search may be performed by rules set name or location. In one embodiment, location may be set as the default. Alternatively, rule set may be set as a default.

In various embodiments, a fraud rule set may comprise supported values for the existing limits and thresholds supported on the platform and the platform may further comprise rules configured by a third party such as Experian or a network processor.

In one embodiment, a valid rule set is required for comparison with a test rule set. For example, a valid rule set comprises all values completed on the form, that is, the parameters are defined. In another example, the valid rule value is defined in terms of the production setting or a new value/time period.

An example of fraud rule comparison results are shown in FIG. 13. Certain parameters are defined in order to compare one or more rule sets. Referring to FIG. 13, the Issuer, the rule set name, file type, start test date, card program, production set name, file comparison duration and ending test date are defined. The rule set comparison time period comprises the number of days that the rule-set will run against production data. In one example, this value falls between 1 and 30 days. In various embodiments, rule sets may be compared against all locations that are attached to the rule set or a single location attached to the rule set. For example, FIG. 13 shows 350 locations using this particular rule set.

The example display screen shown in FIG. 13 can be used to provide the Issuer or Processor with a view of the case creation results. Referring to FIG. 13, the display screen includes a section for the display of case type, production set value, comparison set value, the difference between the production set and the comparison set and the percent change between each set compared.

Figure 14:
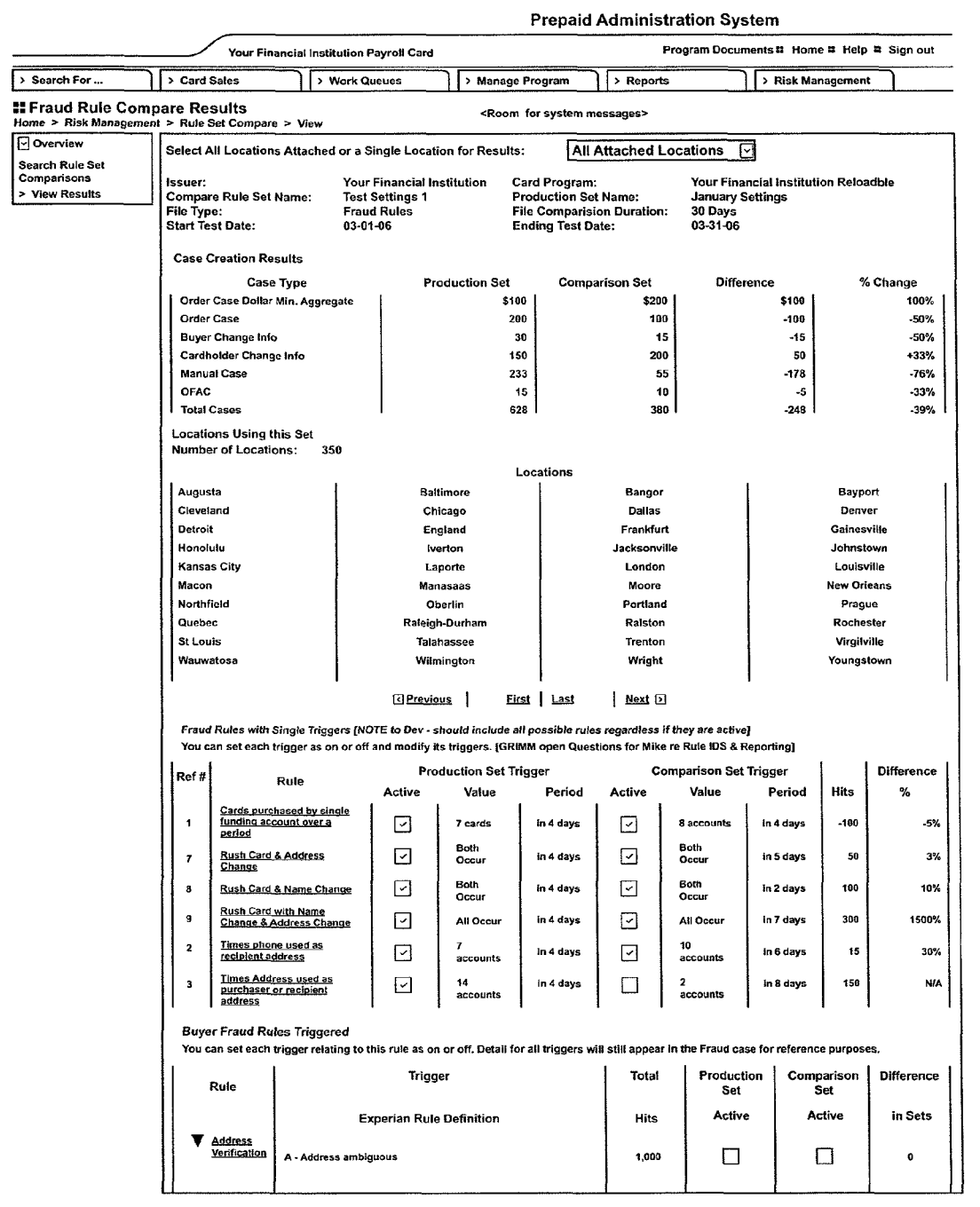

In a further embodiment, the display screen shown in FIG. 14 may further be used to provide the Issuer or Processor with a comparison of the rule triggers for the production compared to the comparison set. In this embodiment, the display screen may include a section showing the Rule, the Production Set Trigger, the Comparison Set Trigger, and the Difference between the number of hits for each set run. In a further embodiment, the Production Set Triggers and the Comparison Set Triggers may further comprise fields to activate/deactivate respective triggers, enter a value and associated period for triggering the rule.

Referring to the Fraud Rules section illustrated in FIG. 14, the first rule triggered was cards purchased by single funding account over a period. In this example, the trigger was active for each the production trigger and the comparison trigger. The value and period for the Production Set Trigger are 7 cards in 4 days whereas, the value and period for the Comparison Set Trigger are 8 accounts in 4 days. The change from 7 cards to 8 accounts resulted in a loss of 100 hits, a difference of −5%.

Still referring to FIG. 14, for the rule, rush card and address change the value and period for the Production Set Trigger were set at Both Occur in 4 days and Both Occur in 5 days for the Comparison Set Triggers. The change from 4 days to 5 days resulted in an increase in 50 hits, or a 3% increase in fraud cases indicated.

In another example, for the rule, rush card with name change & address change, the value/period was set to all occur in 4 days compared to the value/period for the Comparison Set Triggers set to all occur in 7 days. This change resulted in a hit increase of 300 or an increase of 1500% in the number of suspected fraud cases triggered. This is an example where implementation of the rule may have overwhelmed the system had it been implemented prior to testing.

FIG. 15 shows an example display screen that can be utilized to provide an Issuer or Processor with the ability to compare the number of hits triggered by limits or thresholds for current production values and a set of comparison values. For example, as shown for account volume limit, changing the current production values from $2000 in 4 days to $2,500 in 4 days results in a 210 decrease in the number of hits that would have been created using production values. In another example, as shown for account volume threshold, changing the current production values from $2,000 in 4 days to $2,500 in 4 days results in a 230 decrease in the number of hits that would have been created using production values.

In one embodiment, based on the comparison data, an Issuer may move a test rule set into production by requesting implementation of the rule set and following the process as established for production rule sets.

Embodiments of the invention can be implemented via appropriate software or computer program code instructions in combination with appropriate instruction execution platforms, processor(s), hardware or the like. These instructions may be in the form of a computer program product that can cause a CPU to control operation of a processing engine according to an embodiment of the invention. The combination of hardware and software to perform the functions described can form the means to carry out the processes and/or subprocesses of embodiments of the invention. In this regard, each block in the flowcharts or block diagrams may represent a module, segment, action, or portion of code, which comprises one or more executable instructions or actions for implementing the specified logical function(s). Furthermore, an embodiment of the invention may take the form of a hardware embodiment, a software embodiment (including firmware, resident software, micro-code, etc.) or an embodiment combining software and hardware aspects.

Any suitable computer usable or computer readable medium may be used, taking into account that computer program code to operate a processing engine according to embodiments of the invention may reside at various places during assembly. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

In the context of this document, a computer usable or computer readable medium may be any medium that can contain, store, communicate, propagate, or transport the program for use by or in connection with an instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out embodiments of the present invention may be written in an object oriented, scripted or unscripted programming language such as but not limited to Java, Perl, Smalltalk, C++ or the like. However, the computer program code for carrying out embodiments of the present invention may also be written in conventional procedural programming languages, such as the "C" programming language or similar programming languages. It should also be noted that functions and combination of functions described herein can be implemented by special purpose hardware-based systems or operators which perform the specified functions or acts. Any of the functions described in this application may be embodied as computer readable code on a computer readable medium.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

It should be appreciated that reference throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment. Furthermore, the particular features, structures or characteristics may be combined as desired in one or more embodiments of the invention.

What is claimed is:

1. A method of optimizing fraud parameters for prepaid device fraud analysis, comprising:
creating a set of production fraud parameters for prepaid device fraud analysis, the set of production fraud parameters comprising a plurality of parameters;
configuring, using a computer with a processor and a memory, one or more production fraud parameters to create one or more sets of test fraud parameters;
running, using the computer with a processor and a memory, the set of production fraud parameters and the one or more sets of test fraud parameters against production data to produce a result set of one or more suspected fraud cases for the set of fraud production parameters and a result set of one or more suspected fraud cases for each of the one or more sets of test fraud parameters; and comparing, using the computer with a processor and a memory, the result set of one or more suspected fraud cases for the set of fraud production parameters and the result set of one or more suspected fraud cases for each of the one or more sets of test fraud parameters to determine an optimal fraud parameter configuration based on desired results.

2. The method of claim 1, wherein each of the plurality of parameters is defined by at least one of one or more limits, one or more thresholds and one or more rules.

3. The method of claim 2, wherein creating the set of production fraud parameters comprises assigning at least one value to one or more of the limits and one or more of the thresholds.

4. The method of claim 2, wherein the assigned values for at least one of the one or more limits and at least one of the one or more thresholds are selectively changed to create the one or more test fraud parameters.

5. The method of claim 1, wherein creating the set of production fraud parameters further comprises associating triggers with the one or more rules.

6. The method of claim 5, wherein at least one trigger is selectively changed to create one or more sets of test fraud parameters based on the production fraud parameters.

7. The method of claim 2, wherein the one or more rules are configurable by selectively activating or deactivating the one or more rules within the fraud parameters.

8. The method of claim 7, wherein at least one of the one or more rules are selectively activated or deactivated in comparison to the set of production fraud parameters to create each of the one or more sets of test fraud parameters.

9. The method of claim 1, wherein a graphical user interface is provided to facilitate configuration of the production and test fraud parameters.

10. The method of claim 1, further comprising determining a difference between a number of suspected fraud cases associated with each production fraud parameter and a number of suspected fraud cases associated with a corresponding test fraud parameter.

11. The method of claim 10, wherein the difference is a percentage difference.

12. A system for managing prepaid device fraud analysis, comprising:
a database storing prepaid device production data;
a processor; and
a computer readable medium, coupled to the processor and in communications with the database, comprising code executable by the processor, the computer readable medium comprising code for running production data against a set of production fraud parameters and one or more sets of test fraud parameters to produce a set of suspected fraud cases for each set of the fraud production parameters and the test fraud parameters.

13. The system of claim 12, wherein each of the fraud parameters comprise a plurality of fraud triggers defined by one or more limits, one or more thresholds and one or more rules.

14. The system of claim 12, wherein the production data comprises device holder enrollment and load information associated with one or more prepaid devices.

15. The system of claim 12, wherein the one or more limits and the one or more thresholds are further defined by selectively configurable values.

16. The system of claim 13, wherein the one or more rules are further defined by one or more triggers configurable by selectively activating or deactivating within the fraud parameters.

17. An apparatus for optimizing a fraud parameter rule set for analysis of fraud in a prepaid device system, comprising:
one or more databases storing production data;
a processor; and
a computer readable medium, coupled to the processor and in communications with the one or more databases, comprising code executable by the processor, the computer readable medium comprising code for operating a processing engine comprising a platform for running production data against a set of production fraud parameters and one or more sets of test fraud parameters to produce a set of suspected fraud cases triggered by each set of the fraud production parameters and the test fraud parameters and calculating a difference in number of fraud cases produced.

18. The apparatus of claim 17, wherein the sets of production and test fraud parameters comprise a plurality of fraud triggers defined by one or more limits, one or more thresholds and one or more rules.

19. The apparatus of claim 18, wherein the limits, thresholds and rules are configurable.

20. The apparatus of claim 17, wherein the production data comprises device holder enrollment and load information associated with one or more prepaid devices.

21. A method comprising:
selecting, using a computer, one or more test fraud parameters, wherein the test fraud parameters make up a first test fraud parameter set and wherein the first test fraud parameter set is run against production data to produce a first result set of one or more suspected fraud cases; and
viewing the first result set wherein the first result set is displayed via a graphical user interface and wherein viewing the first result set includes comparing the first result set to a production result set.

22. The method of claim 21 wherein each of the test fraud parameters is defined by at least one of one or more limits, one or more thresholds and one or more rules.

23. The method of claim 21 further comprising determining, based on comparing the first result set to the production result set, whether the first test fraud parameter set should be moved into production.

24. The method of claim 21 wherein the selecting one or more test fraud parameters is conducted off-line.

25. The method of claim 21 further comprising setting a time for how long the first test fraud parameter set should be run against the production data.

26. The method of claim 21 wherein the first test fraud parameter set is run in tandem with a second test fraud parameter set against the same set of production data wherein a first result set is produced from the first test fraud parameter set and wherein a second result set is produced for the second test fraud parameter set.

27. The method of claim 26 further comprising comparing the first result set and the second result set.

* * * * *